(12) United States Patent
Narayan et al.

(10) Patent No.: US 12,146,477 B2
(45) Date of Patent: Nov. 19, 2024

(54) BIDIRECTIONAL, LINEAR AND BINARY, SEGMENTED ANTAGONISTIC SERVOMECHANISM-BASED SHAPE MEMORY ALLOY (SMA) ACTUATOR

(71) Applicant: COUNCIL OF SCIENTIFIC AND INDUSTRIAL RESEARCH, New Delhi (IN)

(72) Inventors: Bhargaw Hari Narayan, Madhya Pradesh (IN); Joshi Tilak Chandra, Madhya Pradesh (IN); Hashmi Syed Azhar Rasheed, Madhya Pradesh (IN); Srivastava Avanish Kumar, Madhya Pradesh (IN); John Pretesh, Madhya Pradesh (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 18/491,436

(22) Filed: Oct. 20, 2023

(65) Prior Publication Data

US 2024/0133367 A1 Apr. 25, 2024
US 2024/0229779 A9 Jul. 11, 2024

(30) Foreign Application Priority Data

Oct. 21, 2022 (IN) .............................. 202211060660

(51) Int. Cl.
*F03G 7/06* (2006.01)
*B33Y 30/00* (2015.01)

(52) U.S. Cl.
CPC ....... *F03G 7/0635* (2021.08); *F03G 7/06143* (2021.08); *F03G 7/0616* (2021.08);
(Continued)

(58) Field of Classification Search
CPC .. F03G 7/0635; F03G 7/06143; F03G 7/0616; F03G 7/062; F03G 7/064;
(Continued)

(56) References Cited

U.S. PATENT DOCUMENTS 6,481,821 B1 11/2002 Yun et al.
6,762,515 B2 7/2004 Gummin et al.
(Continued)

FOREIGN PATENT DOCUMENTS

EP 1245762 A1 10/2002
EP 1279784 A1 1/2003
(Continued)

*Primary Examiner* — Mark A Laurenzi
*Assistant Examiner* — Dapinder Singh
(74) *Attorney, Agent, or Firm* — CANTOR COLBURN LLP

(57) ABSTRACT

A Bidirectional, Linear and Binary, Segmented Antagonistic Servomechanism-based Shape Memory Alloy (SMA) Actuator comprising a main stroke transmitting lever (11 or 18) and a plurality of part-modules (15A or 15B) disposed in a closely spaced arrangement and adapted to undergo a reciprocal translation in a first direction. wherein, the part-modules comprising a plurality of segments having SMA elements (12). The invention provides two configurations arranged in 'straight' and 'cross' configurations of the SMA elements in the part-modules. Further above configuration are arranged in a tight close space however, the "cross" configuration provides additional 40% compactness. The configurations comprise a "S-type long tail" or "flipped F-type long tail" main stroke transmitting lever and plurality of "straight" or "cross" configurations part modules, respectively. The novel embodiment can be utilized for micro-positioning of 3D printer filament extruder head, linear and angular displacement applications such as robotic, prosthe-
(Continued)

sis, bi-stable position control, latching-unlatching systems, and other wide engineering applications.

11 Claims, 6 Drawing Sheets

(52) U.S. Cl.
CPC ............. *F03G 7/062* (2021.08); *F03G 7/064* (2021.08); *F03G 7/0665* (2021.08); *B33Y 30/00* (2014.12)

(58) Field of Classification Search
CPC ...... F03G 7/0665; F03G 7/0614; F03G 7/065; F03G 7/06; F03G 7/0636; F03G 7/0612; B33Y 30/00
See application file for complete search history.

(56) References Cited

U.S. PATENT DOCUMENTS

| | | | |
|---|---|---|---|
| 6,832,477 B2* | 12/2004 | Gummin | ................. F03G 7/065 60/527 |
| 8,398,128 B2 | 3/2013 | Arabia et al. | |
| 11,199,183 B2* | 12/2021 | Miller | ..................... F03G 7/065 |
| 11,821,410 B2* | 11/2023 | Brown | ................ F03G 7/06143 |
| 11,841,008 B1* | 12/2023 | Panwar | ............... F03G 7/06143 |
| 2007/0175213 A1 | 8/2007 | Featherstone et al. | |
| 2016/0083824 A1* | 3/2016 | Brown | ................... C22F 1/006 148/563 |

FOREIGN PATENT DOCUMENTS

| | | |
|---|---|---|
| EP | 1300532 A1 | 4/2003 |
| KR | 100366652 B1 | 1/2003 |

* cited by examiner

BIDIRECTIONAL, LINEAR AND BINARY, SEGMENTED ANTAGONISTIC SERVOMECHANISM-BASED SHAPE MEMORY ALLOY (SMA) ACTUATOR

CROSS-REFERENCE TO RELATED APPLICATION

This application is a U.S. Nonprovisional application and claims priority to Indian Application No. 202211060660, filed on Oct. 21, 2022, which is incorporated herein by reference in its entirety.

FIELD OF THE INVENTION

The present invention generally relates to linear bi-directional actuators utilizing smart materials.

More particularly the present discloser specifically relates to the bi-directional linear actuator that employs the Shape Memory Alloy (SMA) material to provide the controlled stroke length displacement in reiteratively large number of cycles during the operation of the mechanical system. This invention provides forward and backward-controlled motion by the plurality of segments of the SMA elements with the plurality of rigid strip(s) arranged together in specific antagonistic configurations across the main stroke transmitting lever. The SMA material exhibits the Shape Memory Effect (SME) property while phase conversion at specific transformation temperatures. The SME property enables it to retain its predetermined shape that causes strain recovery along with a large tensile force which is suitable for driving an external mechanical actuation. Further, the invention includes a plurality of sub-modules consisting of SMA elements and rigid strip(s) with an electrical heating module. The compact design of the embodiments is achieved by the series cascading configuration of the part-modules. There are two design configurations such as the 'straight' and the 'cross' configuration of the segments of the SMA elements that deliver large stroke displacement in an additive manner. The operation of the discloser is controlled by any external logical programmable command and control signals applied from a standard external controller.

BACKGROUND

Actuators are an important and critical component that are widely used in almost all modern automation systems including industries, automobiles, defence, machineries, instruments, in computer peripherals such as disks and printers, and many other places where motion with actuation force is required. Commonly available linear actuators include diverse types of linear actuators such as hydraulic, pneumatic, piezoelectric, and electromagnetic actuators. These are available in different shape, size, output stroke displacement and force, and mostly operate by AC and/or DC power source. The widespread adaptation of electromagnetic actuators offers several limitations due to their complex mechanical design, attachment of gear assembly and rotation conversion mechanism to linear and angular motion, vibration, bulky and accommodation at the end application. In recent years, SMA based actuator systems have gained much popularity due to their remarkable properties such as high force-to-weight ratio, high strain recovery capability, large recovery force generation, lightweight, simpler mechanical design, compact size, exhibiting sizeable electrical resistance, good elasticity, and long fatigue life, thereby making SMA based actuator systems a highly appropriate choice for modern applications.

U.S. Pat. No. 6,762,515 B2, this patent describes the linear actuator wherein long stroke and actuation force is provide the by the SMA wire material, and the long stroke is achieved by stroke amplification of the multiple SMA wire elements connected thru the multiple bars or rods (sub-modules) in serial mechanical connection. In this and other SMA driven actuator system understood that the requirement of restoring force is necessary for resetting (extending) the SMA wire in cooled state after contraction due to heated state. Many stated priors are designed used common spring assembly like helical or leaf spring to exert the required restoring force. This and other patents and publications have been used one side active SMA wires for forward stroke and return the stroke by resetting spring. These springs produced restoring force varies linearly with displacement, $(F=k*x)$, and restoring force is maximum when the stroke at maximum and this kind of restoring mechanism limited the useful life of the SMA actuator.

U.S. Pat. No. 6,832,477 B2, this embodiment SMA wire is used as the actuation elements in the forward direction due to heating and in the cooling state resetting of the SMA wire elements to their original length by the Intrinsic Return Means (IRM) not by any external resetting helical or leaf spring. The IRM means nothing, but the same SMA wire has been exhibiting the reversible shape memory effect which is also known as two-way shape memory effect of the material. The reversible shape memory effect of the material has shown limited strain recovery and resetting force and life span of shape memory effect is limited in cyclic manner.

US 2007/0175213 A1, this application seeks to provide a controller for improving the speed of the actuation of SMA actuator. The controller is regulating the heating current to the SMA actuator based on the intrinsic resistance variation of the SMA actuator. The controller generates control signals according to the monitored resistance variation of the SMA material.

EP patent no. 1300532 A1 of latch assembly describes the application of shape memory alloy wire for unlatching the sticker from latch assembly. Here SMA actuator is an integral part and housed inside of the latch assembly. SMA wire is mounted in returning spring biased arrangement to the pivotally moving pawl mechanism. SMA actuator energized by electrically which caused the contraction and rotated the pawl at the safety position to open and close the door. This invention relates to operation of the latch assembly but not shown the lock-unlock the striker.

EP patent no. 1279784 A1 motor vehicle door lock describes the application of the shape memory alloy actuator for releasing the striker from the door lock. Here SMA actuator is an integral part and housed inside of the lock assembly and provide the rotatory movement to catch element through release lever. The contraction force by SMA is used for movement of release lever for releasing the sticker from catch elements. This invention is related to the operation of the lock assembly for unlatching operation.

EP patent no. 1245762 A1 describes the application of the shape memory alloy actuator for opening the door lock/latch. The SMA wires worked as mechanical transmission elements between the doors lock and control device. The control device located at a distance from the lock, a mechanical transmission link which connects the control device to the lock, shape memory actuator being arranged in between as a mechanical transmission link, externally with respect to the lock, in such a way that the lock can be opened by actuation of the shape memory actuator, operated by the control device, in which case the shape memory actuator acts simply as a mechanical device belonging to transmission link.

U.S. Pat. No. 8,398,128 B2, describes a vehicle door latch system configured to temporarily prevent door latch mechanisms from unlatching during a predetermined event is provided. It has fork-bolt pivotally mounted arrangement for moving between a latching position and an unlatching position. The movement of fork-bolt is restricted by block out mechanism. This block out mechanism configured for movement between a blocking position and an unblocking position. The movement of block out mechanism is activated by the SMA wire and biased spring between blocking and unblocking position. Here also the SMA is integral part and housed inside of the latch system to provide the movement for blocking position.

By reference to U.S. Pat. No. 6,481,821 B1 discloses an actuator for an ink jet printer head using a shape memory alloy which includes a lower space part; a silicon substrate where said lower space part is formed; an insulating film formed on said silicon substrate surface and made of a silicon oxide film which acts to push the shape memory alloy film to nozzle side direction and a silicon nitride film which acts to pull the shape memory alloy film in a direction opposite to nozzle side; and a shape memory alloy layer formed upon said insulation film so as to cover said lower space part.

By reference to KR Patent application number KR 100366652 B1 discloses a silicon substrate on which the lower space portion is formed; It consists of silicon nitride film that pulls the thin film of shape memory alloy in the direction opposite to the nozzle direction, or the silicon oxide film and the shape memory alloy thin film pulls in the opposite direction to the nozzle direction. An insulating film formed on a surface of the silicon substrate, the silicon nitride film having a function of pulling the film.

The above information disclosed is only for enhancement of understanding of the background of the invention. Despite the large interest in SMA-based actuators identified in the prior art, none of the practical actuators have been shown to provide control stroke displacement using of SMA material in both forward and backward directions for large number of cycles. It is understood that the SMA material requires external bias force for restarting its quiescent length during the cooling cycle, and most designers in the prior art employed an external bias steel spring for resetting quiescent length. However, these configurations generate a variable force and extreme at maximum stroke displacement that causes degradation of the useful life and force-displacement chrematistics. This limitation has been addressed in several prior arts by appropriate biasing configuration to reset the SMA. Another limitation observed is to accommodate the useful length of SMA wire by wrapping over the pulleys for compacting the device, however, the curvature in the SMA by pulleys causes uneven contraction and expansion that results in a reduction in stroke displacement and generated force as not observed in the case of straight SMA wire. It would be desirable to develop an SMA-based actuator that can provide a substantial magnitude of actuation force while achieving maximum stroke length displacement in a compact design of antagonistic configuration using straight SMA wire elements.

Objectives of the Invention

The main objective of the present invention is to provide a novel actuation device comprises of the shape memory alloy (SMA) components as an actuator element.

Another objective of the present invention is to provide the stroke displacement in bidirectional i.e. back and forth (forward & reverse) directions with actuation force.

Another objective of the present invention is to provide the actuation by the SMA material that represented shape memory effect (SME) at specific transformation temperatures.

Another objective of the present invention is to provide bidirectional movement by the plurality of the SMA element(s) in wire form arranged in antagonistic configuration.

Another objective of the present invention is to arrange the segments of the SMA element(s) in the part-modules and to arrange part-modules at both sides of the main stroke transmitting lever.

Another objective of the present invention is to provide a device that comprises part modules and main stroke transmitting lever arranged in linear additive stroke configuration.

Another objective of the present invention is to provide the device that part-modules comprises of rigid strips with plurality of segment of the SMA elements and main stroke transmitting lever.

Another objective of the present invention is to provide mounting orientation of the part-modules along with main stroke transmitting lever are either in width direction or in height direction to miniaturized of actuator dimensions and constant volumetric size.

Another objective of the present invention is to develop the part-modules by the rigid strips and segments of the SMA elements are attached at the ends to the strip by laser or spot electric welding method.

Another objective of the present invention is to develop the actuator device by the plurality of part-modules are attached in such a way to the next neighbouring part modules in serial mechanical cascading configuration for generating additive stroke displacement.

Another objective of the present invention is to provide the resultant full stroke length at the main stroke transmitting lever by the additive summation of the stroke produced by each part-module(s).

Another objective of the present invention is to provide the rigid strips are electrically conductive to provide the path of electrical current flow in it or non-conducting strips that has provision to maintain the path of electrical current flow through it with attached segments of the SMA elements.

Yet another objective of the present invention is to provide bidirectional (back and forth) linear and binary segmented SMA actuator find extensive applications in industrial, domestic, commercial, automobile, aero-space, automation & control, appliance, safety & security, 3D printer head motion & positioning, prosthetic, robotic and electronics industries. Further, the binary positional back and forth applications of the actuator are widely ranging from door lock-unlock, automobile latch-unlatch, windshield wipers motion and directional air flow of wind blower motions, rear view mirror adjustment in automobiles to pin pullers and shutter controllers of space mechanical design actuation.

SUMMARY

This summary is provided to introduce a selection of concepts, in a simplified format, that are further described in the detailed description of the disclosure. This summary is neither intended to identify key or essential inventive concepts of the disclosure nor is it intended for determining the scope of the disclosure.

The main aspect of the invention provides a Bidirectional, Linear and Binary Segmented Antagonistic Servomechanism-based Shape Memory Alloy (SMA) actuator comprising a main stroke transmitting lever and a plurality of part-modules disposed in a closely spaced arrangement and adapted to undergo a reciprocal translation in a first direction. The part-modules comprising a plurality of the segments of the SMA elements, further, the part-modules are connected with the adjacent part-modules and main stroke transmitting lever, and each segment of the SMA element extending longitudinally in the first direction.

In another aspect of the invention provides a plurality of part-modules, which are developed by the segments of the SMA elements in wire or strip shape, and rigid metallic/non-metallic strips. These part modules are arranged in an antagonistic configuration at both sides of the main transmitting level that delivers long stroke displacement during forward and backward movement. The embodiment employs the Nitinol shape memory material and its shape memory effect property, which is entirely dependent on external temperature stimuli. The linear actuator is designed for repetitive operation with safe strain recovery of up to 8% that delivers long stroke displacement with significant force generated upon heating of the SMA wire element above well-defined phase transition temperature. It relaxes when cooled below the phase transition temperature. The shape memory effect is also expressed by the different metallic alloys that can use in place of Nitinol with appropriate temperature stimuli.

In another aspect of the invention, the segment of the SMA element is working with a specific predetermined transition temperature of 70-90° C. The phase transformation temperature varies depending on the alloy's chemical composition; and material selection criteria depends on the operating conditions and end applications of linear actuator. It observes that the SMA-based linear actuator requires restoring force for resetting the quiescent length when the transformation temperature falls below the martensitic phase transition temperature.

In another aspect of the invention provide an antagonistic configuration of part modules comprising the segment of the SMA elements. The novel arrangement generates a time-varying recovery force during phase transformation from martensitic to austenitic that utilizes as a bias resetting force on the opposite side part module segment of the SMA elements. Time-varying bias resetting force is effective when the one side segments of the SMA elements are in the martensitic phase and the opposite side segments of the SMA elements are gradually transforming from martensitic to the austenitic phase. The process repeats on the other side part-module when the operating conditions are reversed, and process repeats of resetting in the next cycle and vice-versa.

In another aspect of the invention, the operation of the invented linear actuator is controlled by pulses of electrical energy or train of Pulse Width Modulation (PWM) control signal with a suitable electrical power source. The magnitude of applied electrical power regulates different parameters such as total stroke length displacement, net actuation force generation, response time, operating speed, and working bandwidth of the embodiment.

In another aspect of the invention provide actuator that comprises a plurality of part-modules that are interconnected in series cascading arrangements to provide total stroke length displacement by an additive summation of individual part-module stroke length. The part-module dimensions, in length and width, are confined to maintain the size miniaturization of the linear actuator assembly. The part-module designs are such that they are serially cascaded either on the horizontal side or on the vertical side of the present embodiment. The serial cascading of the part-modules provide design flexibility to the end users in terms of mounting space at the application site. The main stroke transmitting lever is suitably located in the embodiment that provides the total stroke length with net generated actuation force for external actuation.

In another aspect of the invention provide part-modules in two different innovative formations with the main stroke transmitting lever. In the first formation, the part-modules are arranged at both sides of the main transmitting lever with a 'straight' configuration of the segments of the SMA elements and in the second formation, part-modules are arranged at one side of the main transmitting lever with a 'cross' configuration of the segments of the SMA elements. The main stroke transmitting lever assembly comprises of main stroke transmitting lever, and segments of the SMA elements are welded at the curve ends of the lever. The main stroke transmitting lever is developed by a pair of strips, joined firmly with the sandwiching of an insulating strip. The strips are joined in a particular orientation that forms the 'S-type long tail' and 'flipped F-type long tail' type structures of the main stroke transmitting lever. In another aspect of the invention, the rigid strips are made of conducting or non-conducting materials. In the case of non-conducting strips used, a suitably electrical continuity is provided between the end points with welding post for the SMA elements. The segments of the SMA elements are developed by crimping of metallic ferrule. The 'straight' configuration of part-module is developed by welding of two segments of the SMA elements on the ends of rigid 'S-type' conducting/non-conducting strip. The 'cross' configuration of part-module is developed by 'S-type' & 'flipped S-type' rigid strips are joined together with an insulating strip sandwich between them to form an 'I-section type' structure. The four segments of the SMA elements are welded in a 'cross' configuration at the ends of the 'I-section type' structure. Any suitable welding method such as laser or electric spot-welding method can be used to weld at the end points of strips, avoiding any degradation of SMA material properties. The expansion of the linear actuator is further possible in either horizontal or vertical direction by attaching of the next part-modules at the end of the previous part-module.

In another aspect of the invention, all the part-modules are connected in a serial mechanical cascading arrangement to form the SMA link that provide series electrical conducting path for flowing of heating current through the segments of the SMA elements. The electrical current produces a joule heating to each of the segments of the SMA elements in the link that causes phase transformation due to rise in temperature. The phase transformation causes contraction (strain recovery) in each of the segment of the SMA elements which are connected in serial mechanical arrangements. Therefore, the net stroke length is the addition of each strain recovery from each segment of the SMA element. The linear actuator produces net stroke length displacement with the equal driving force for actuation. The identical configuration is formed at the opposite side of the main stroke transmitting lever to build an antagonistic SMA link. Both sides of the SMA links are mechanically connected and electrically isolated with the main stroke transmitting lever. The actuator device will attend the stroke length by passing a controlled electrical current in both sides of the SMA links. The actuation force can be increased by adding/arranging more segments of the SMA elements in parallel with the existing segments of the SMA elements in the part-modules. The stroke length of the actuator device is increased by adding/arranging more part-modules in series cascading with the previously attached part-modules.

In another aspect of the invention, the present invention relates to the actuation and can be used and explored for other applications wherein displacement with high actuation force is the critical requirement. The present embodiment finds extensive applications in industrial, domestic, and commercial sectors like automobile, aerospace, common appliances, energy, chemical processing, 3D printer filament extruder head motion, prosthetics, orthotics, robotics, and electronics (MEMS devices) industries for automation & control, heating & ventilation, safety & security, and bidirectional positioning such as linear, angular positioning and control, micro-displacement, etc. Some of these applications apply similar methods, concepts, or techniques, which are also applicable to other areas. The binary 'ON/OFF' positional applications of the actuator are widely ranging from electric door lock-unlock, home door latch-unlatch, vehicle door latch system, vehicle trunk/boot door, fuel tank lid, car central security latch system, and bidirectional motion for windshield wipers motion, directional airflow of wind blower motions, rear view mirror adjustment in automobiles, pin pullers and shutter controllers of space mechanical design actuation or other similar kinds of applications.

To further clarify the advantages and features of the methods, systems, and apparatuses, a more particular description of the methods, systems, and apparatuses will be rendered by reference to specific embodiments thereof, which are illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF THE DRAWINGS

These and other features, aspects, and advantages of the disclosure will become better understood when the following drawing description is read with reference to the accompanying drawings in which like characters represent like parts throughout the drawings, wherein.

Figure 1:
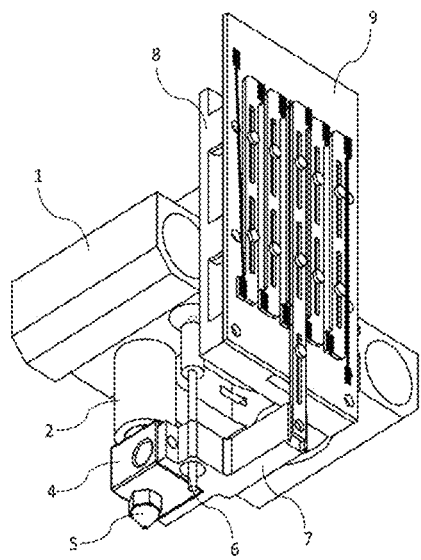
FIG. 1 is the drawing of an isometric view illustrating the application of bidirectional segments of the shape memory alloy elements for the micro-positioning of the 3D printer head extruder, as per an embodiment herein.

Labels of figures: 1. Printer head base plate, 2. Circular guideway with bush assembly, 3. Extruder Throat, 4. Heater Block, 5. Nozzle, 6. Guide Shaft, 7. Stroke transfer connecting link, 8. Mounting base, 9. Mounting plate, 10. S-type rigid strip(s) (10A-10D), 11. S-type long tail stroke transmitting lever(s) (11A, 11B), 12. Segment(s) of the SMA element (12A-12F), 13. Fastening pin(s), 14. Crimp by metallic ferrule(s) (14A-14B), 15. Part-module(s) (15A, 15B), 16. Flipped S-type rigid strips, 17. Insulating strip, 18. 'Flipped F-type long tail' main stroke transmitting lever, 19. Mounting and guiding slit.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

DETAILED DESCRIPTION

To promote an understanding of the principles of the disclosure, reference will now be made to the various embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates. It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment", "some embodiments", "one or more embodiments" and similar language throughout this specification may, but do not necessarily, all refer to the same embodiment. The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or sub-systems or other elements or other structures or other components or additional devices or additional sub-systems or additional elements or additional structures or additional components.

Embodiments of the disclosure will be described below in detail with reference to the accompanying drawings.

Figure 2:
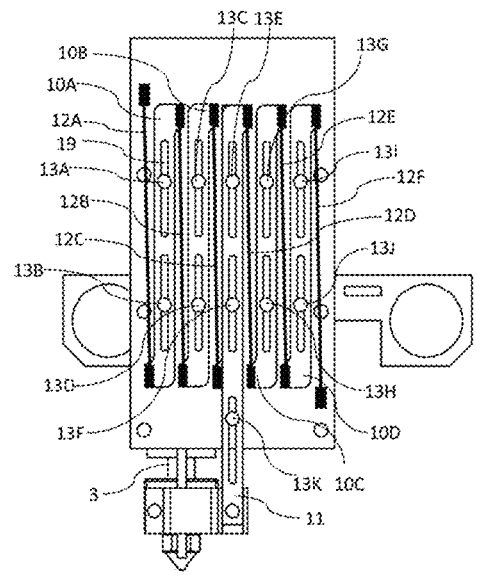
FIG. 2 is the diagram that illustrates the orthographic view of the assembly of the main stroke transmitting lever and part-modules on antagonistic/opposite sides of the main stroke transmitting lever to provide bidirectional linear additive stroke and other essential components, as per an embodiment herein.

The present invention provides a bidirectional, linear and binary segmented antagonistic servomechanism-based shape memory alloy (SMA) actuator, wherein the straight configuration comprising: a main stroke transmitting lever (11) and a plurality of part-modules (15A) disposed in a closely spaced arrangement and adapted to undergo a reciprocal translation in a first direction; wherein, the part-modules (15A) comprising a plurality of segments of the SMA elements (12), further, the segments of the SMA elements (12) are connected between the adjacent part-modules (15A) and main stroke transmitting lever (11), and each segment of the SMA element (11) extending longitudinally in the first direction; wherein the main stroke transmitting lever (11) undergoes reciprocal translation in the returned direction from the first direction by closely spaced arrangement in opposite/antagonistic configuration by the plurality of part-modules (15A); wherein, the antagonistic configuration of part-modules (15A) comprises the plurality of segments of the SMA elements (12), each segment extending longitudinally generally in the returned direction and segment of the SMA elements (12) connected between two adjacent part-modules and main stroke transmitting lever (11);

The present invention as illustrated in FIG. 1 and FIG. 2, provides an embodiment of the invention which includes a 3D printer head comprises a printer head base plate 1 that holds all supporting accessories and components including a mounting plate 9 of the novel linear actuator to provide exact linear motion of the nozzle 5. The printer head components; A circular guideway assembly 2 having a bush assembly (which includes bush holder 2A and bush 2B) is attached to the printer head base plate 1 to provide a frictionless linear motion to the extruder assembly (4 and 5). The circular guideway assembly 2 guides an extruder throat 3 in linear motion. The mounting base 8 is attached to the printer head base plate 1 by grub screws. In an embodiment, an S-type main stroke transmitting lever 11 is connected with the extruder assembly (4 and 5) by a stroke transfer connecting link 7. The use of a guide shaft 6 provides an external support to the extruder assembly movement and controls linear motion. The guide shaft 6 is fabricated with a stiff, high-strength metal rod; press fitted to the printer head base plate 1. A Teflon bush (not shown) is fixed in the stroke transfer connecting link 7 to provide frictionless motion of the guide shaft 6. The extruder throat 3 works as a guiding path of the printing material/filament to the heater block 4 for the melting of print material. It is also precisely mated width wise with the circular guideway assembly 2 to provide stiffness and linear movement to the extruder assembly (4 and 5). A Teflon tube is pre-filled in the extruder throat 3 to avoid sticking of melted filament. The extruder throat 3 is further connected to the heater block 4, which is fabricated with a metallic material to melt the feed filament and maintain the flow of melted material for the printing process. The extruder throat 3, and the heater block 4 are connected by self-threading. The lower side of the heater block 4 is attached to the nozzle 5 to pass melted material for printing. A hole on the heater block 4 has the provision of fixing an electric heater element (not shown) and a thermocouple (not shown). The stroke transfer connecting link 7, made of a high-strength and thermal insulator material, creates the link between the main stroke transmitting lever 11 and the heater block 4. The invention provides the movement to attach circular guideway assemblies 2 having the Teflon bush, and the connected assembly of heater block 4 and the nozzle 5. It is the part that directly connects the actuator assembly to the heater block 4. It is now joined with the heater block 4 with the help of the tiny screws (not shown). The mounting base 8 holds the complete assembly of the invented linear actuator by a mounting plate 9.

The present invention as illustrated in FIG. 2, provides an embodiment of the invention which describes the front view of the complete assembly as shown in FIG. 1. The long tail S-type main stroke transmitting lever 11 is connected with the part-modules 15A via the segment of the SMA elements 12 crimped by metallic ferrules 14. The crimping end 14A of the SMA element 12A is welded on the mounting plate 9, and the other end 14B is welded on the end of actuator strip 10A. The pattern follows on the other side also, where the crimping end 14B of the SMA element 12F is welded on the mounting plate 9, and another end 14A is welded on the end of actuator strip 10D. The S-type main stroke transmitting lever 11 is associated in series with other 'S-type' rigid strips (10A-10D) and SMA wire elements (12A-12F) in such that they form the complete links of SMA wire segments. The S-type main stroke transmitting lever 11 and S-type rigid strips (10A-10D) are mounted on the mounting plate 9 with the help of metallic fastening pins 13 (13A-13J). S-type strips 10A and 10B provide backward direction movement to the S-type main stroke transmitting lever 11 whereas S-type strips 10C and 10D provide forward direction movement to the S-type main stroke transmitting lever 11. All the strips (10 and 11) of the embodiment are fixed on the mounting plate 9 with mounting and a guiding slit 19 by the fastening pins 13, in such a way to maintain close tolerance and frictionless sliding.

Figure 3:
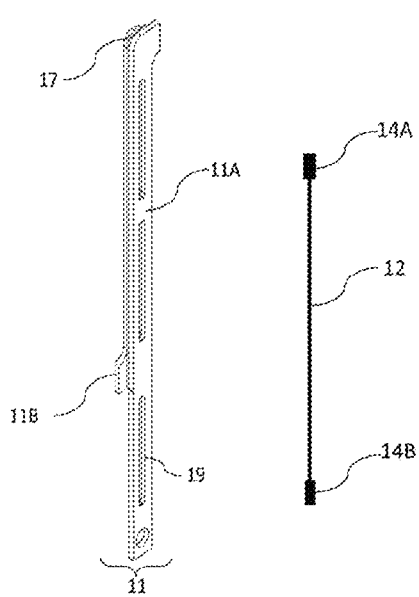
FIG. 3 is the diagram illustrating the main stroke transmitting lever, as per an embodiment herein.

The present invention as illustrated in FIG. 3, provides an embodiment of the invention which describes the various parts of the S-type main stroke transmitting lever 11 in which two strips 11A and 11B are attached to each other with a sandwiched insulating strip 17 to maintain electrical insulation with high strength between them.

Figures 4, 5:
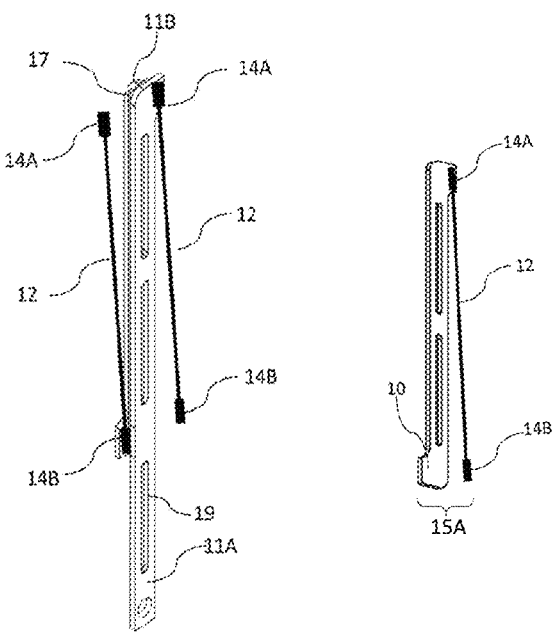
FIG. 4 is the diagram showing the segment of the SMA element, as per an embodiment herein.
FIG. 5 is the diagram illustrating the assembly of the segments of the SMA element and the main stroke transmitting lever, as per an embodiment herein.

The present invention as illustrated in FIG. 4 provides an embodiment of the invention which shows a segment of the SMA element 12, which is to be welded at the ends of the S-type main stroke transmitting lever 11 and S-type rigid strips 10 with the help of the crimped metallic ferrule 14. The interconnection in the series electrical connection of the segments of the SMA elements 12 forms the complete link of the SMA wire actuation. When heating current flows through them, total length changes, which is directly transferred to the S-type main stroke transmitting lever 11 for stroke displacement.

The present invention as illustrated in FIG. 5, provides an embodiment of the invention which shows the S-type main stroke transmitting lever 11 (FIG. 3) arranged with the segment of the SMA elements (FIG. 4) in such a way that the total displacement from each segment of the SMA elements 12 can transfer to the next part-module SMA segment. The open ends of the segment of the SMA elements 12 are further connected to the S-type rigid strip 10 (part-modules shown in FIG. 6).

Figure 6:
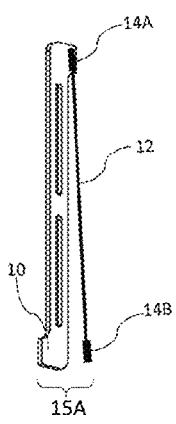
FIG. 6 is the diagram illustrating the assembly of the S-type part module, as per an embodiment herein.

The present invention as illustrated in FIG. 6, provides an embodiment of the invention which shows the S-type part module 15A, which is connected in plurality with the S-type main stroke transmitting lever 11. The S-type part module is assembled with the S-type rigid strip 10 and the segment of the SMA elements 12.

Figure 7:
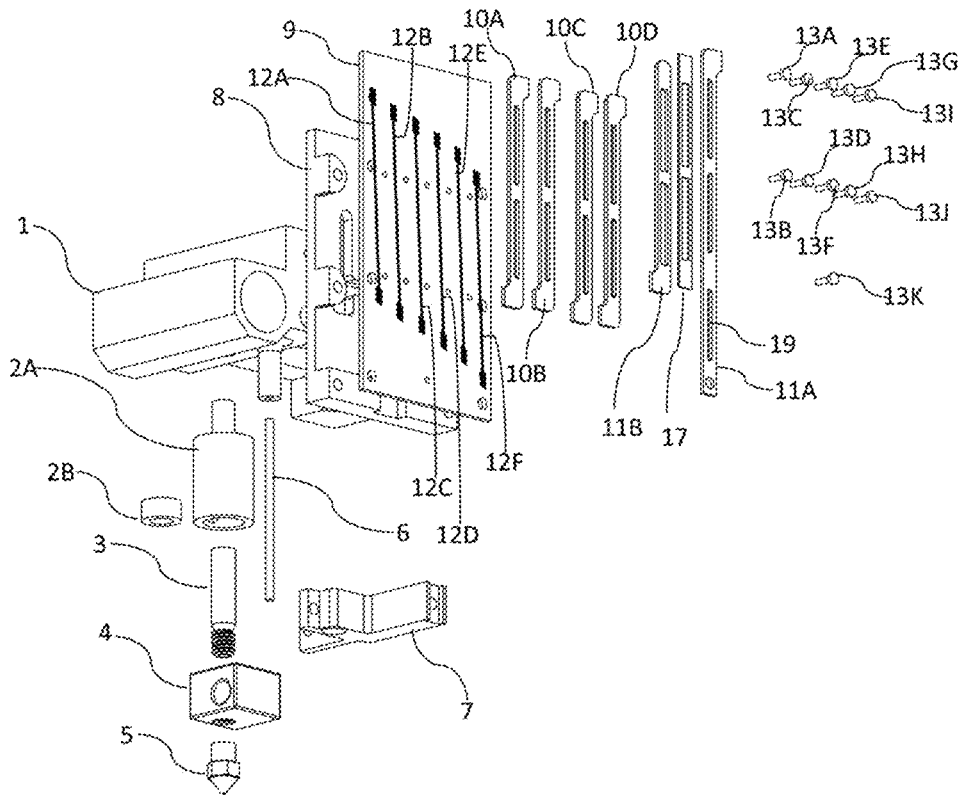
FIG. 7 is the exploded assembly view of the 'straight' configuration for the embodiment.

The present invention as illustrated in FIG. 7, provides an embodiment of the invention which represents an exploded view of the printer head assembly and the complete assembly of linear actuator 'straight' configuration of SMA segments, some of which are in multiple numbers, can be seen in a periodic manner for a connected functioning. The placement of different components such as the S-type rigid strips 10, the S-type main stroke transmitting lever 11, segments of the SMA elements 12, the mounting plate 9, and the fastening pins 13 etc. can be seen in this assembly diagram with all the associated parts, as well as their functioning can be related to each other.

Figure 8:
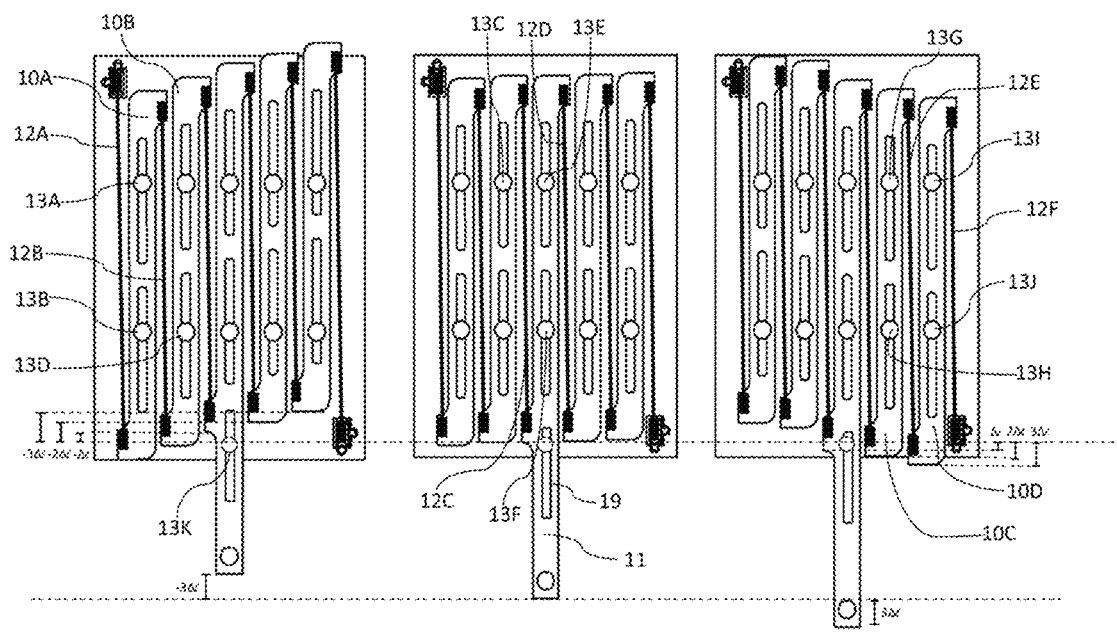
FIG. 8 is the diagram illustrating the working stages of the 'straight' configuration of the embodiment in backward position, central position, and forward position, as per an embodiment herein.

The present invention as illustrated in FIG. 8 provides an embodiment of the invention which depicts the different working stages of the 'straight' configuration of the linear actuator. Mainly three different working stages are shown and explained in the figure. In the first stage, a backward direction (say negative) additive displacement ($-3\Delta l$) observe first side links made of three SMA elements, which is caused by applying pulling force generated in other side links made by three SMA elements via the S-type main stroke transmitting lever 11. The SMA elements 12A, 12B, and 12C exhibit expansion by the recovery bias force applied due to contraction in the SMA elements 12D, 12E, and 12F; net resulting stroke displacement obtain $-3\Delta l$ by the S-type main stroke transmitting lever 11. Similarly, the third stage (rightmost corner) shows a positive displacement of $-3\Delta l$ because the segment of the SMA elements 12D, 12E, and 12F exhibit expansion with respect to bias force applied due to contraction of the SMA elements 12A, 12B, and 12C by the external stimuli. The central geometry is kept at a free position at which no force is acting on any side of the segment of SMA elements 12. The overall total displacement is a summation of individual displacements $\Delta l$ produced by individual segments of SMA elements (12A-12C and 12D-12F).

Figure 9:
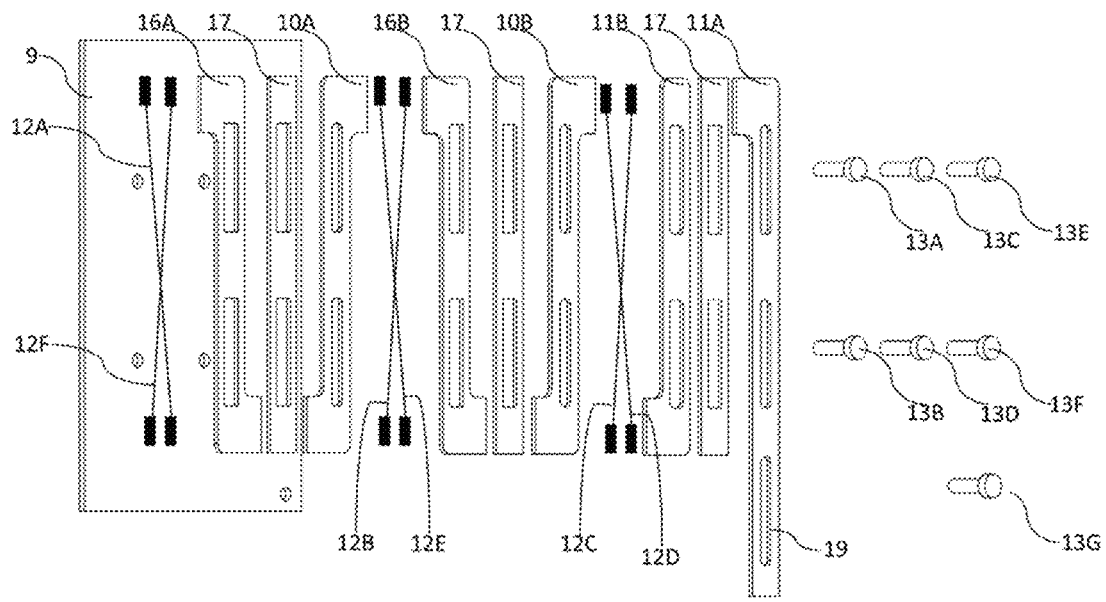
FIG. 9 is the diagram illustrating the exploded assembly of the 'cross' configuration for the embodiment, as per an embodiment herein.

The present invention as illustrated in FIG. 9 provides an embodiment of the invention which shows an assembly of the 'cross' design configuration of the linear actuator in compact design, which provides bidirectional stroke displacement for linear and binary actuation applications. The 'cross' configuration design is 40% compact than the 'straight' configuration of the embodiment. The mounting plate 9 accommodates segments of the SMA elements 12A and 12F welded one end on the anchor at the surface. The other ends of the segments of the SMA elements 12A and 12F are welded on the S-type rigid strip 10A and flipped S-type rigid strip 16A, which are separated by the sandwiched insulating strip 17. Similarly, the rest of the segments of the SMA elements 12B, 12E, 12C, and 12D are attached to strips 10B, 16B, 11B, and 11A. All these strips are attached to the mounting plate 9 by the fastening pins (13A-13F). The SMA elements 12D, 12E, and 12F create forward direction series electrical link and the SMA elements 12A, 12B and 12C create backward direction series electrical link of the SMA. The movement starts by contraction and expansion in the forward and backward SMA elements 12 links when electrical stimuli is applied to either of the link that translates the strain recovery to stroke transmitting lever for net stroke displacement of the embodiment.

Figure 10:
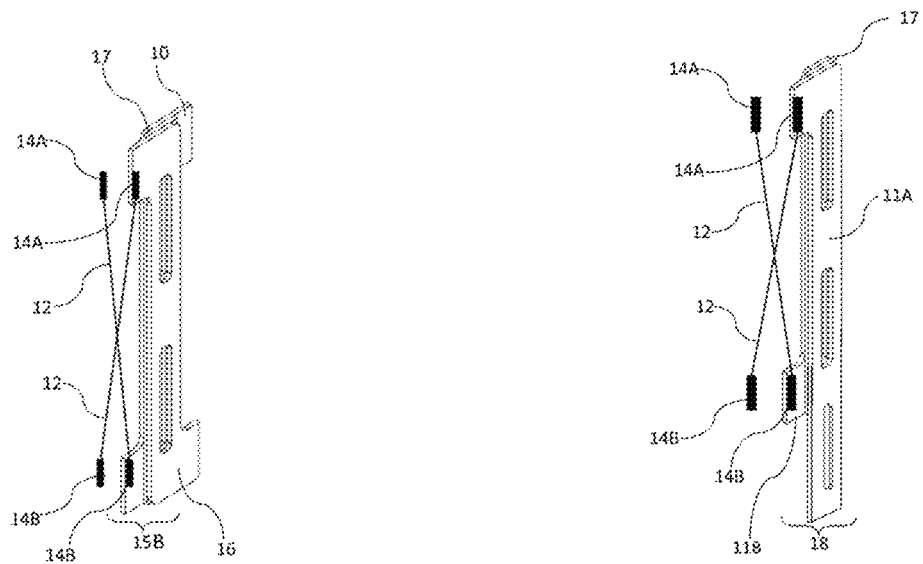
FIG. 10 is the diagram illustrating the assembly of the I-type section part-module, as per an embodiment herein.

The present invention as illustrated in FIG. 10 provides an embodiment of the invention which shows the isometric view of 'cross' configuration I-section type part-module 15B. The I-section part-module 15B comprising of S-type rigid strips 10 and the flipped S-type rigid strips 16 pasted together with sandwiching of the insulating strip 17 to make I-section type of strip. The segments of the SMA elements 12 are attached at one ends of S-type rigid strips 10 and the flipped S-type rigid strips 16 of the I-section type to develop the complete 'cross' configuration design part module of the embodiment. The part-module 15B is attached with flipped F-type long tail main stroke transmitting lever 18 to create assembly of the embodiment. The role of the sandwich insulating strip 17 is to provide insulation between the top-bottom strips and these strips are maintained the electrical continuity among the top-top side strips and bottom-bottom side strips of attached part-modules. The 'cross' configuration design of the embodiment is highly compact than the 'straight' configuration (FIG. 2). The I-section part-module 15B ensures the motion in forward and backward direction of the flipped F-type main stroke transmitting lever 18 in one direction according to applied control signals.

Figure 11:
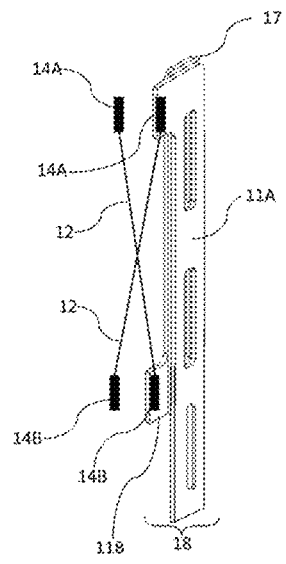
FIG. 11 is the diagram illustrating the assembly of flipped F-type stroke transmitting lever, as per an embodiment herein.

The present invention as illustrated in FIG. 11, provides an embodiment of the invention which shows the flipped F-type main stroke transmitting lever 18 used to transfer the stroke displacement with actuation force for external work/actuation, in association of attached part-modules 15B. The segments of the SMA elements 12 are attached at the ends of individual strips at the I-section part-module 15B and the F-type main stroke transmitting lever 18 to build the embodiment (FIG. 9). When there is a contraction in one of the complete links made by the segment of the SMA elements in association with the F-type main stroke transmitting lever 18, it moves in forward direction, and when there is a contraction in other complete link made by the segment of the SMA elements, the flipped F-type main stroke transmitting lever 18, it moves in the backward direction. The tail end of flipped F-type main stroke transmitting lever 18 can be attached for actuation of external work.

Figure 12:
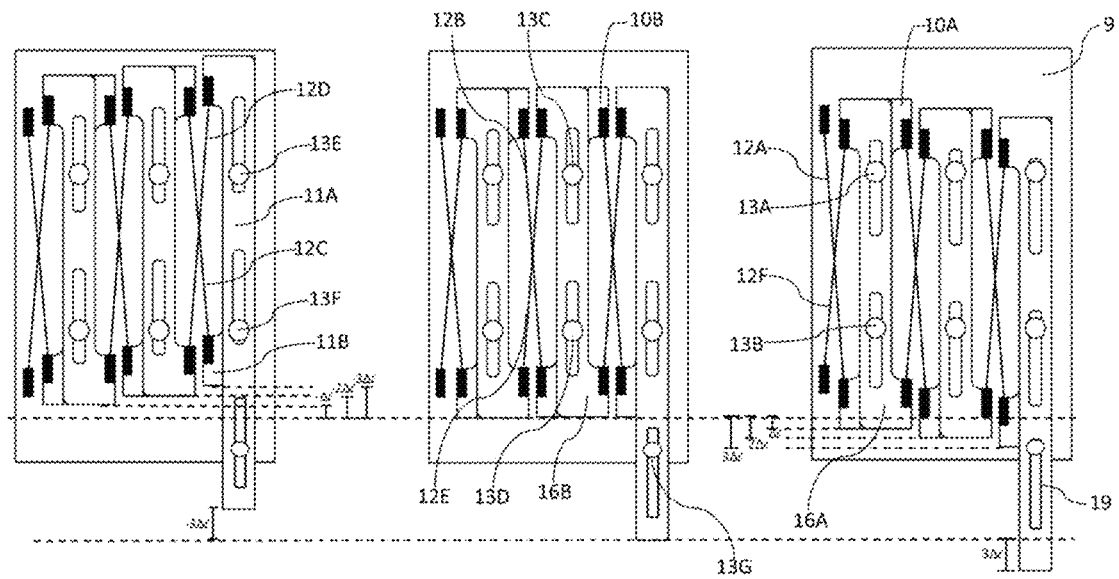
FIG. 12 is the diagram illustrating the working stages of the 'cross' configuration of the embodiment in backward position, central position, and forward position, as per an embodiment herein.

The present invention as illustrated in FIG. 12, provides an embodiment of the invention which shows the working stages of 'cross' configuration design linear actuator. Three distinct stages are shown and explained in the figure. In the first stage, a backward direction (say negative) additive displacement ($-\Delta l$) observe in top series link made of three SMA elements, which is caused by applying pulling force generated in bottom series link made of three SMA element via the 'flipped F-type' main stroke transmitting lever 18.

The segment of the SMA elements 12A, 12B, and 12C illustrate a contraction with respect to external stimuli resulting in a net negative movement of −3Δl to the 'flipped F-type' main stroke transmitting lever 18. Similarly, another geometry at the rightmost corner shows a positive displacement of 3Δl because the segment of the SMA elements 12D, 12E, and 12F shows a contraction with respect to external stimuli. Second and central geometry is kept at an accessible position where no force is acting on any side of the Segment of the SMA elements 12. The total displacement is a summation of the individual's displacements (Δl) produced by group of three segment of the SMA elements, 12A, 12B, 12C in backward (negative) direction and group of three SMA elements in opposite side, 12D, 12E, 12F, produced displacement in forward (positive) directions.

In another embodiment, the operation of the invented linear actuator is controlled by pulses of electrical energy or train of Pulse Width Modulation (PWM) control signal with a suitable electrical power source. The magnitude of applied electrical power regulates different parameters such as total stroke length displacement, net actuation force generation, response time, operating speed, and working bandwidth of the embodiment. These parameters are also directly related to the dimensions (length and diameter) of employed SMA wire. The overall volumetric dimensions of the assembly depend on the number of part-modules used, and each part-module stroke length contributes to yielding total stroke length in an additive manner and net actuation force by the invention. Therefore, the number of part-modules develop by segmenting the whole length designed SMA wire. The total resultant stroke length represents by 'SL' defined by $$SL_f = \Sum_{i=1}^{n} \Delta l_i \quad (1)$$

$$SL_b = \Sum_{i=1}^{n} \Delta l_i \quad (2)$$

where f is forward and b is backward stroke length of part-module, and i=1, 2, . . . n (segments of the SMA elements in part-module)

At equilibrium, the total stroke length (SL) by part-module is $$SL_f = -SL_b \quad (3)$$

Specifications of the Actuator

| S. No. | Parameter | Range |
|---|---|---|
| 1. | Max pull/push force | 2.6 kg |
| 2. | Actuator element(s) length | 165 mm (3 segments of 55 mm at each side) |
| 3. | Stroke length (mm) | ~5 mm (Up to 6, @ 3 elements at each side) |
| 4. | Actuator element(s) diameter | 0.381 mm |
| 5. | Number of Actuator element(s) | Minimum—2 Numbers @ 1 element at each side Maximum—Multiple of 2 (Up to 6, @ 3 elements at each side) (depending on the required displacement) |
| 6. | Transformation Temperature | 70-90° C. |
| 7. | Stroke length range | 2-8 mm (Depending on the no. of actuator element) |
| 8. | Stroke direction | Bi-direction |
| 9. | Input Voltage | 4.2 V DC |
| 10. | Peak Current | ~1 A |
| 11. | Power | 4.2 Watts |
| 12. | Full Stroke Actuation time | 1-3 Seconds |
| 13. | Reset time interval | 1-2 Seconds |
| 14. | Actuation Control | PWM based controller |

While specific language has been used to describe the subject matter, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

EXAMPLES

The experiments were performed to measure the performance of the invented SMA actuator quantitatively. The experimental setup consists of an invented SMA actuator, PC-based controller and data acquisition system, measurement sensors for stroke length (displacement) and net load for external work done, and a regulated power supply with the connected heating module. The joule heating technique is employed for regulating the heating current by the pair of PWM signals generated from a PC-based NI DAQ (National Instrument Data acquisition) system. Generated load was measured by a pair of load cells (LC) of measuring capacity 10 lb from Honeywell Inc., USA. The first end of LC is rigidly mounted at the mounting base 8 and another end is firmly connected to the loose end of the segments of the SMA elements 12. A laser displacement sensor (IL-30 along with IL-100 amplifier from Keyence, Japan) was employed for stroke length (displacement) measurement. The multi-function NI-DAQ card PXIe-6341 was used for data acquisitions.

Example 1

Figure 13:
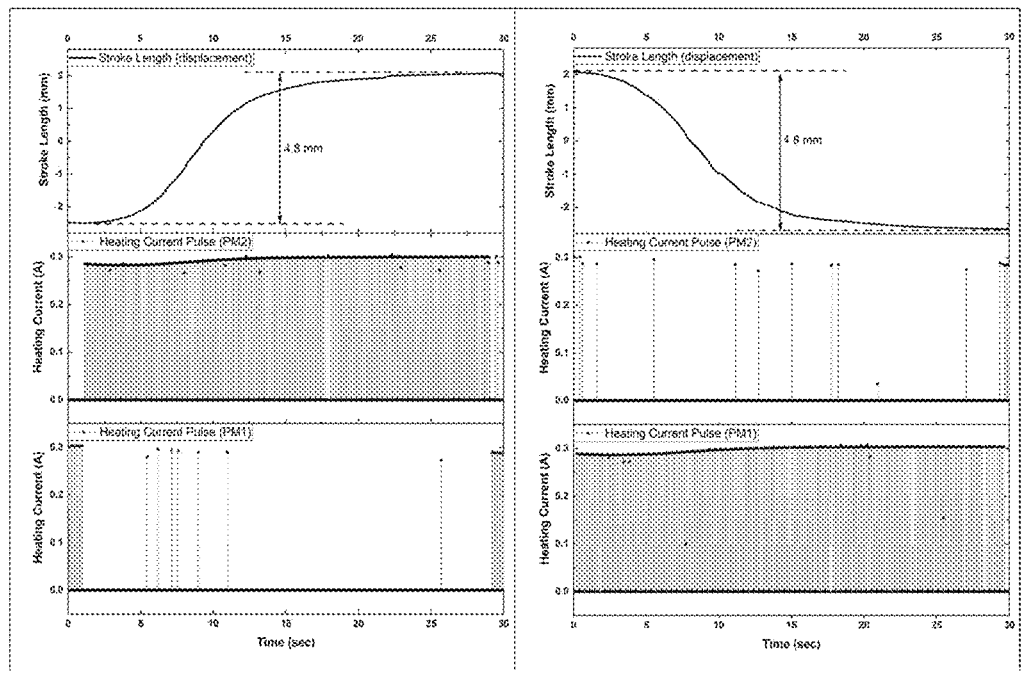
FIG. 13 is the measured stroke displacement with applied PWM current pulses for control heating, as per an embodiment herein.

The first example demonstrates the stroke length (displacement) measurement of the invented bidirectional linear SMA actuator. The PWM controlled heating pulses are applied to both sides of the main stroke transmitting lever part-modules (PM1 & PM2) simultaneously in 37% and 1% of the PWM duty ratio. The conditions of duty ratio are flipped in the next interval to complete one cycle of the forward and backward motion. The total stroke length in the forward and backward direction is measured of 4.8 mm. The measured stroke length and applied control heating pulses for one complete cycle are shown in FIG. 13.

Example 2

Figure 14:
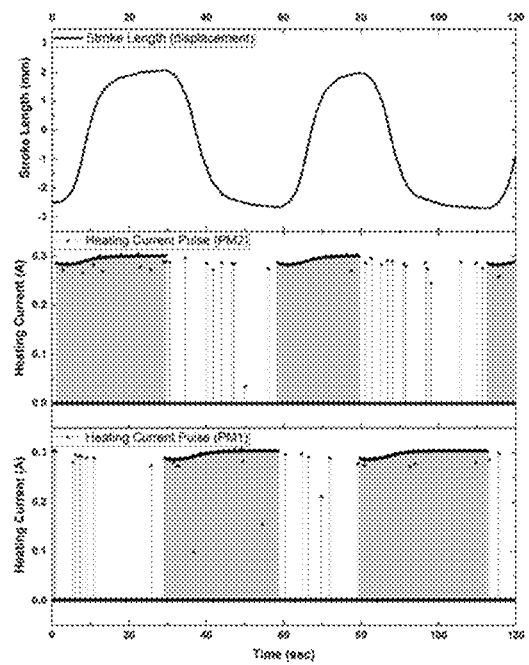
FIG. 14 is the repetitive measurement of the full stroke displacement with applied PWM current pulses for control heating for forward and backward motion, as per an embodiment herein.

The second example demonstrates the repeatability of 4.8 mm stroke length in forward and backward direction motion of both part-modules (PM1 & PM2) with respect to simultaneously applied heating current pulses as shown in FIG. 14. As part module 2 is activated the device moves in the forward direction and gets stable after reaching to maximum limit. When part module 1 is activated the device moves in the backward direction and gets stable after reaching to maximum limit.

Example 3

Figure 15:
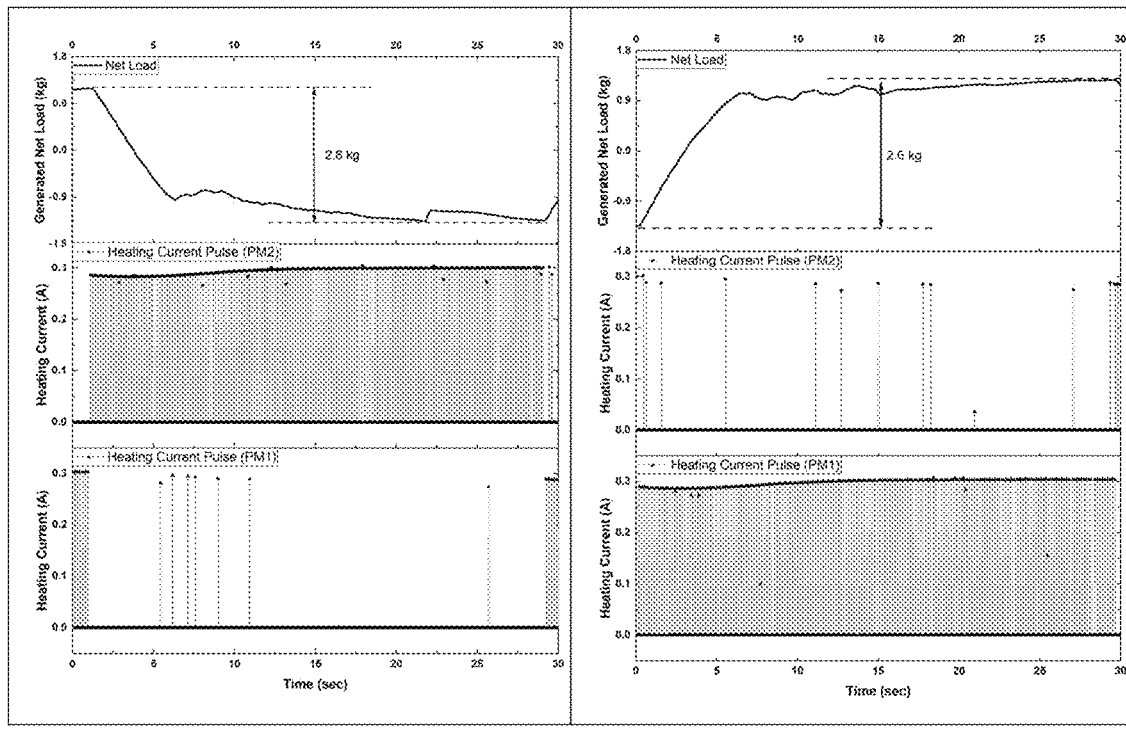
FIG. 15 is the measured net load for external work done with applied PWM current pulses for control heating, as per an embodiment herein.

The third example demonstrates the net load measurement from the invented SMA actuator for the external work done. The PWM controlled heating pulses are applied to both the part-modules (PM1 & PM2) simultaneously in 37% and 1% of the PWM duty ratio and the conditions of duty ratio are flipped in the next interval to complete one cycle of forward and backward motion. The total net load in the forward and backward directions is measured of 2.6 kg. The observations of the net load and applied control heating pulses for one complete cycle are shown in FIG. 15.

Example 4

Figure 16:
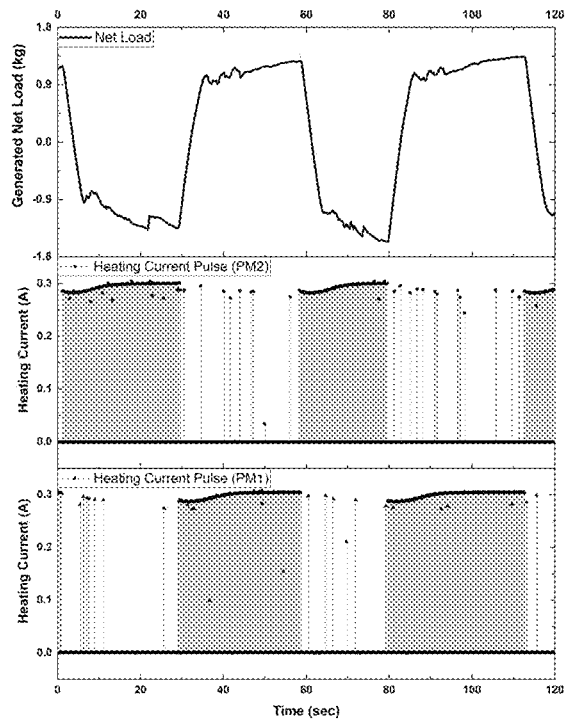
FIG. 16 is the repetitive measurement of net load with applied PWM current pulses for control heating of the forward and backward motion, as per an embodiment herein.

The fourth example demonstrated the repeatability of measured 2.6 kg net load for external work done in forward and backward motion of both part-modules (PM1 & PM2) with respect to simultaneously applied heating current pulses as shown in FIG. 16. As part module 2 (PM2) is activated, the device moves in the forward direction and generates push force and stable after reaching to maximum limit. When part module 1(PM1) is activated the device moves in the backward direction and generates pull force and stable after reaching to maximum limit in return direction.

Example 5

Figure 17:
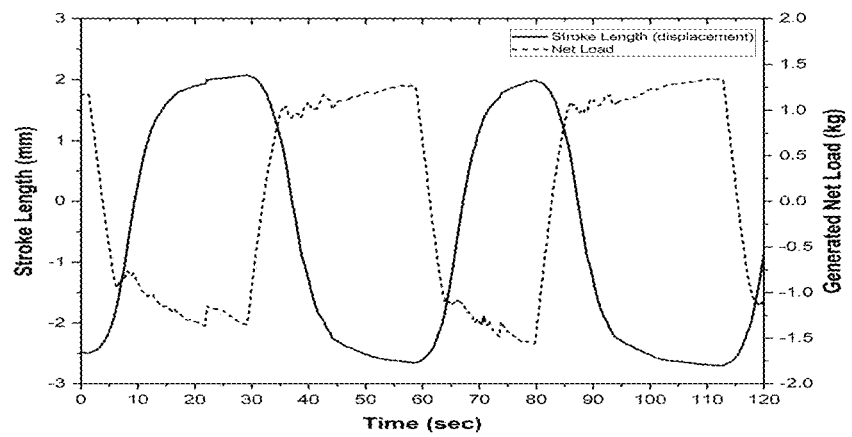
FIG. 17 is the measurement of the net load and total stroke displacement by the embodiment in reiterative cycles, as per an embodiment herein.

In example 5, the combined output measurements of the forward and backward strokes of the developed device are shown. The device can produce 4.75-4.85 mm of total forward and backward stroke length (displacement) with 2.5-2.8 kg net load generated for external pulling and pushing of work done in each cycle of the operation. The results are plotted in FIG. 17.

We claim:

1. A Bidirectional, Linear and Binary, Segmented Antagonistic Servomechanism-based Shape Memory Alloy (SMA) Actuator in a straight configuration, comprising:
a S-type long tail main stroke transmitting lever; and
a plurality of S-type part-modules disposed in a closely spaced arrangement and adapted to undergo a reciprocal translation in a first direction, wherein the plurality of S-type part-modules comprises:
a plurality of segments having SMA elements, wherein the plurality of segments having the SMA elements are connected between the adjacent S-type part-modules and the S-type long tail main stroke transmitting lever, wherein each segment of the plurality of segments having the SMA elements extends longitudinally in the first direction,
wherein the S-type long tail main stroke transmitting lever undergoes reciprocal translation in a return direction from the first direction by the closely spaced arrangement in an antagonistic configuration by the plurality of S-type part-modules,
wherein the antagonistic configuration of the plurality of S-type part-modules comprises the plurality of segments having the SMA elements, each segment of the plurality of segments extends longitudinally in the return direction and the plurality of segments having the SMA elements is connected between two adjacent S-type part-modules and the S-type long tail main stroke transmitting lever,
wherein the antagonistic configuration of the plurality of S-type part-modules in series cascading arrangement at both sides of the S-type long tail main stroke transmitting lever is to provide an additive resultant stroke in both forward and reverse directions,
wherein the additive resultant stroke of the SMA Actuator is used to provide linear and angular or circular motion of actuation,
wherein the SMA Actuator is capable to provide variable stroke displacement from minimum to maximum stroke length with variable magnitude of actuation force in both the forward and reverse directions,
wherein, based on a joule heating of the SMA elements beyond a phase transition temperature, the S-type part-modules are adapted to translate the displacement to the S-type long tail main stroke transmitting lever in the first direction, each S-type part-module undergoing a stroke displacement concerning the adjacent S-type part-modules,
wherein the S-type long tail main stroke transmitting lever provides a motion between the first direction and the reverse direction of full stroke displacement forming the straight configuration, and
wherein the SMA Actuator is designed to accommodate the whole length of the SMA element in the segments of the SMA elements, that are cascaded in series arrangement along with movable S-type rigid strips.

2. The Bidirectional, Linear and Binary, Segmented Antagonistic Servomechanism-based SMA Actuator of claim 1, wherein the plurality of the S-type part-modules further comprises a plurality of conducting/non-conducting S-type rigid strips of curve ends, wherein each of the plurality of conducting/non-conducting S-type rigid strips is designed in such a way to move linearly in the first direction and the reverse direction through a guiding slit with guided pins; wherein the plurality of segments having the SMA elements form a serial mechanical and electrical connection between the adjacent S-type part-modules and the S-type long tail main stroke transmitting lever, that combines the stroke displacements of the S-type part-modules in an additive manner; the curved ends of strips are welded with open ends of the segments of the SMA elements to form the series electrical and mechanical connections that produce resultant long stroke displacement in the first direction and the reverse direction.

3. The Bidirectional, Linear and Binary, Segmented Antagonistic Servomechanism-based SMA Actuator of claim 1, wherein the plurality of S-type part-modules with the segments of the SMA elements create series cascading of electrical conductivity from a first curve end of the S-type part-module to a second curve end of the adjacent S-type part-module and similarly series cascading continues with next set of S-type part-modules first curve end to the adjacent S-type part-module second curve end create first direction cascading link, wherein, identical configuration also develops in antagonistic side of the S-type long tail main stroke transmitting lever to create reverse direction cascading link.

4. The Bidirectional, Linear and Binary, Segmented Antagonistic Servomechanism-based SMA Actuator of claim 1, wherein to create series electrical connectivity, in the first direction and the reverse direction, the plurality of S-type part-modules and the segments of the SMA elements are connected end-to-end by electric arc spot welding for passing the electrical current from a first end of the segment of the SMA element to a next end of adjacent S-type part-module to the last segment of the SMA element of adjacent S-type part-module to a fixed anchor point.

5. The Bidirectional, Linear and Binary, Segmented Antagonistic Servomechanism-based SMA Actuator of claim 1, wherein the plurality of part-modules is configured in a nested, concentric, telescoping relationship either increasing in width wise or increasing in height wise for maintaining a constant volume that provides design flexibility.

6. The Bidirectional, Linear and Binary, Segmented Antagonistic Servomechanism-based SMA Actuator of claim 1, wherein the plurality of S-type part-modules on each side of the S-type long tail main stroke transmitting lever in the antagonistic configuration is electrically isolated from each other, and wherein, the plurality of S-type part-modules at each side are in series electrically connected encompassing all the plurality of the segments of the SMA elements.

7. The Bidirectional, Linear and Binary, Segmented Antagonistic Servomechanism-based SMA Actuator of claim 1, wherein the plurality of S-type part-modules includes a plurality of S-type rigid strips, and wherein a displacement of each S-type rigid strip is added to a displacement of respective adjacent S-type rigid strip, and wherein the SMA Actuator is applicable in the bidirectional movement of a 3D printer head.

8. The Bidirectional, Linear and Binary, Segmented Antagonistic Servomechanism-based SMA Actuator of claim 1, wherein the SMA Actuator provides Max pull/push force of range 2.6 kg, wherein one or more actuator elements have a length of 165 mm including 3 segments of 55 mm at each side, wherein the stroke length is approximately 5 mm with up to 6 elements including 3 elements at each side, wherein the one or more actuator elements have a diameter of 0.381 mm, wherein a minimum number of actuator elements is 2 including 1 element at each side and a maximum number of actuator elements is a multiple of 2 with up to 6 elements including 3 elements at each side depending on the required displacement, wherein the Transformation Temperature is of 70-90° C., wherein the Stroke length is in a range of 2-8 mm depending on the number of actuator elements, wherein the Stroke direction is Bi-direction, wherein an input Voltage is 4.2 V DC, wherein the peak Current is approximately 1 A, wherein the power is of 4.2 Watts, wherein the Full Stroke Actuation time is of 1-3 Seconds, wherein the Reset time interval is of 1-2 Seconds, wherein the SMA Actuator is miniaturize in size, has_capability of efficient rapid heating control module, has stroke sensing mechanisms and is suitable for accurate position control application by suitable external logical/PC/microcontroller-based control systems.

9. A Bidirectional, Linear and Binary, Segmented Antagonistic Servomechanism-based Shape Memory Alloy (SMA) Actuator in a cross-configuration, comprising:
a flipped F-type long tail main stroke transmitting lever; and
a plurality of I-section type part-modules arranged in a closely spaced arrangement and adapted to undergo a reciprocal translation in a first direction,
wherein the plurality of I-section type part-modules comprises:
a plurality of segments of SMA elements,
a S-type rigid strip, and
a flipped S-type rigid strip, wherein the S-type rigid strip and the flipped S-type rigid strip are combined to form a I-section type structure,
wherein the plurality of segments of the SMA elements forms a series cascading configuration through a topside of the I-section type part-modules extending longitudinal in the first direction with adjacent cross configuration created with I-section type part-modules,
wherein, based on a joule heating to the top-side series cascading configuration of the segments of the SMA elements beyond a phase transition temperature, the I-section type part-modules are adapted to translate the displacement at the flipped F-type long tail main stroke transmitting lever in the first direction, wherein each of the I-section type part-modules undergoes the stroke displacement with respect to the adjacent arranged I-section type part-modules, wherein, in an actuator assembly of the cross-configuration, the flipped F-type long tail main stroke transmitting lever undergoes reciprocal translation in a return direction from the first direction by the closely spaced arrangement of I-section type part-modules, wherein segments of the SMA elements form the series cascading configuration through the bottom side of the strip, extending longitudinally generally in the return direction with adjacent cross-configuration formed by the I-section type part-modules, wherein, based on a joule heating to the bottom-side series cascading configuration segments of the SMA elements beyond the phase transition temperature, the I-section type part-modules are configured to translate the displacement at the flipped F-type long tail main stroke transmitting lever in the return direction, wherein each I-section type part-modules undergoes the stroke displacement with respect to adjacent arranged I-section type part-modules, wherein the plurality of I-section type part-modules are arranged in a close tight space which comprises of a S-type and flipped S-type conducting/nonconductive rigid strips jointed with a sandwich of an insulating strip, and a plurality of segments of the SMA elements are welded tightly at the ends of the top-side and bottom-side of I-section part-module stripes, which form the link of segments of the SMA elements in series cascading arrangement along with flipped F-type long tail main stroke transmitting lever, wherein a flipped F-type long tail main stroke transmitting lever comprised of two strips jointed together with an insulating strips for electrical isolation and coupled mechanically to transfer strain during phase transformation, wherein, the loose ends of series connected segments of the SMA elements link terminate at fixed anchor point to complete the mounting, wherein the SMA Actuator further includes first ends of the top and bottom series links made of SMA elements that are connected to the both ends of the flipped F-type long tail main stroke transmitting lever and remaining last ends of top and bottom series link are connected to fixed anchor points of a main base plate.

10. The Bidirectional, Linear and Binary, Segmented Antagonistic Servomechanism-based SMA Actuator of claim 9, wherein the SMA Actuator provides Max pull/push force of range 2.6 kg, wherein one or more actuator elements have a length of 165 mm including 3 segments of 55 mm at each side, wherein the stroke length is approximately 5 mm with up to 6 elements including 3 elements at each side wherein the one or more actuator elements have a diameter of 0.381 mm, wherein a minimum number of actuator elements is including 1 element at each side and a maximum number of actuator elements is a multiple of 2 with up to 6 elements including 3 elements at each side depending on the required displacement, wherein the Transformation Temperature is of 70-90° C., wherein the Stroke length is in a range of 2-8 mm depending on the number of actuator elements, wherein the Stroke direction is Bi-direction, wherein an input Voltage is 4.2 V DC, wherein the peak Current is approximately 1 A, wherein the power is of 4.2 Watts, wherein the Full Stroke Actuation time is of 1-3 Seconds, wherein the Reset time interval is of 1-2 Seconds, wherein the SMA Actuator is miniaturize in size, has capability of efficient rapid heating control module, has stroke sensing mechanisms and is suitable for accurate position control application by suitable external logical/PC/microcontroller-based control systems.

11. The Bidirectional, Linear and Binary, Segmented Antagonistic Servomechanism-based SMA Actuator of claim 9, the cross configuration of the I-section type part-module provides 40% compactness to a straight configuration of the SMA Actuator, wherein the SMA Actuator is applicable in the bidirectional movement of a 3D printer head.

\* \* \* \* \*